United States Patent [19]
Sawert

[11] 3,937,383
[45] Feb. 10, 1976

[54] HIGH SPEED ROOM TEMPERATURE SEAM BONDING OF METAL SHEETS

[75] Inventor: Walter Sawert, LaGrange, Ill.

[73] Assignee: Continental Can Company, Inc., New York, N.Y.

[22] Filed: Mar. 24, 1975

[21] Appl. No.: 561,567

[52] U.S. Cl. .................. 228/115; 228/190
[51] Int. Cl.² .......................... B23K 21/00
[58] Field of Search ........... 228/115, 116, 117, 190

[56] References Cited
UNITED STATES PATENTS

| | | | |
|---|---|---|---|
| 3,024,299 | 3/1962 | Nijhuis et al. | 228/115 X |
| 3,733,691 | 5/1973 | Mann | 228/115 X |

Primary Examiner—Harold D. Whitehead
Assistant Examiner—Margaret Joyce
Attorney, Agent, or Firm—John J. Kowalik; Joseph E. Kerwin; William A. Dittmann

[57] ABSTRACT

An improved pressure welding technique permits high speed room temperature seam bonding of metal sheets. A metal interlay is placed between the faying surfaces to be bonded and the assembly is compressed until the interlay is properly spread over the faying surfaces. The interlay has a cross-section designed to produce a highly differential flow when subjected to external compressive loads. This differential flow causes shear movement between the interlay and the faying surfaces which effects the weld. Joining speeds in excess of 10 feet per second are possible, with a reduction in sheet thickness of about 5 percent.

16 Claims, 8 Drawing Figures

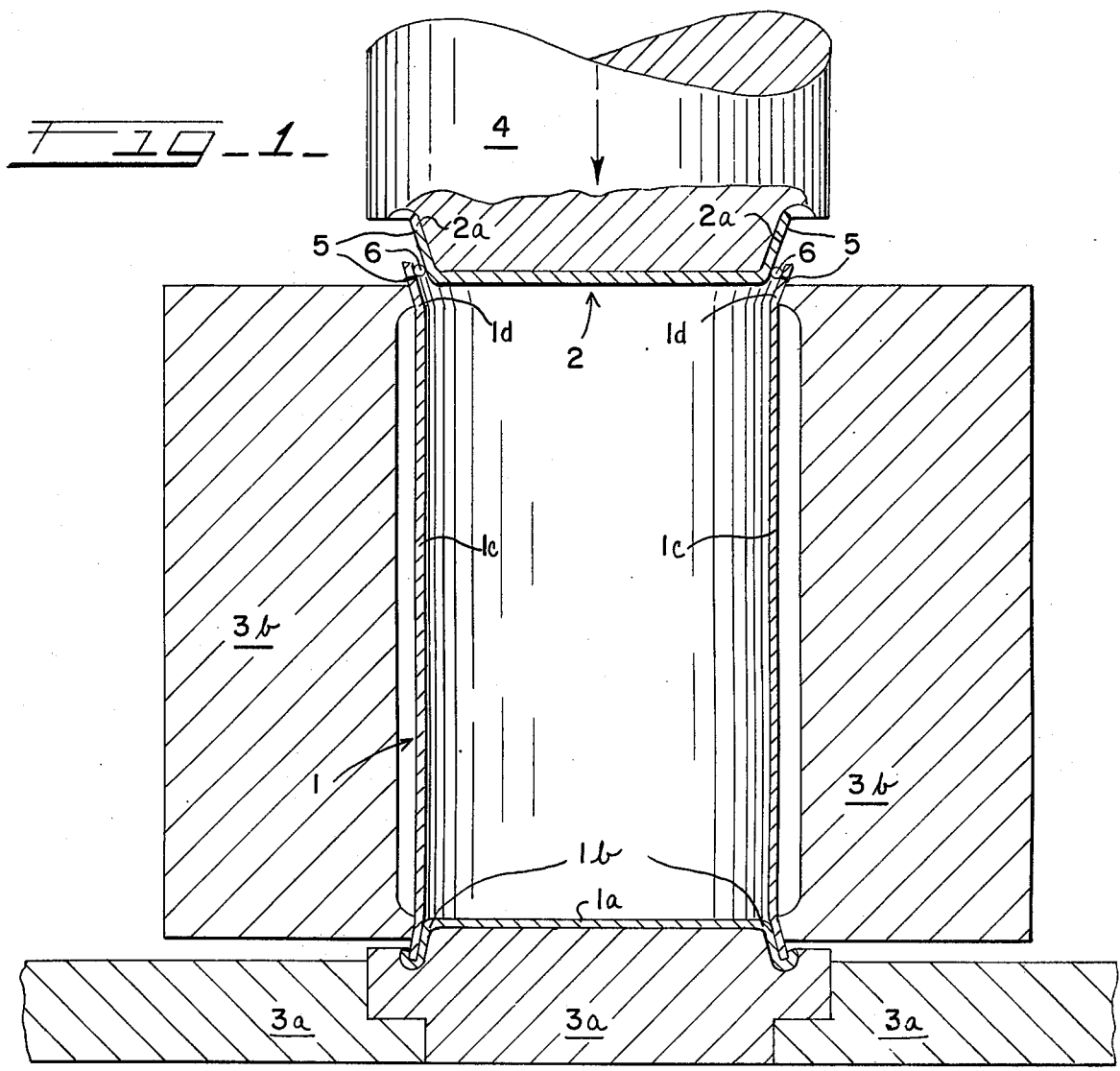

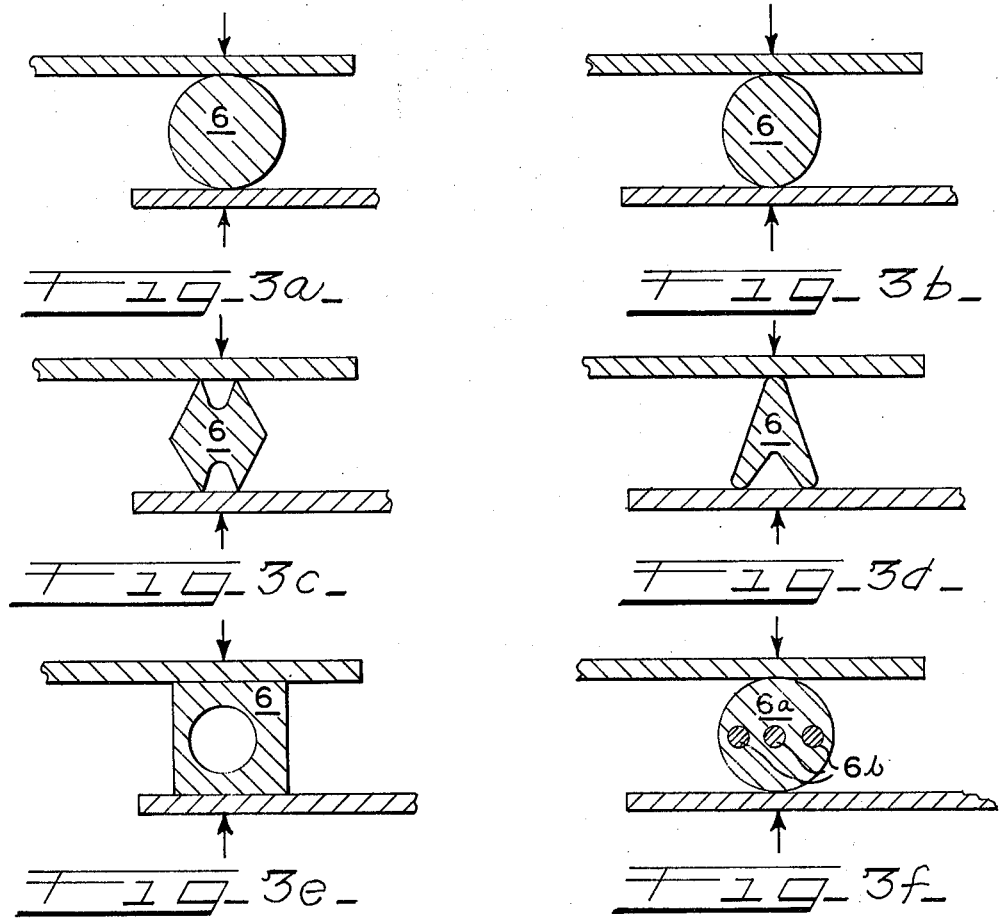
Fig. 3a  Fig. 3b
Fig. 3c  Fig. 3d
Fig. 3e  Fig. 3f
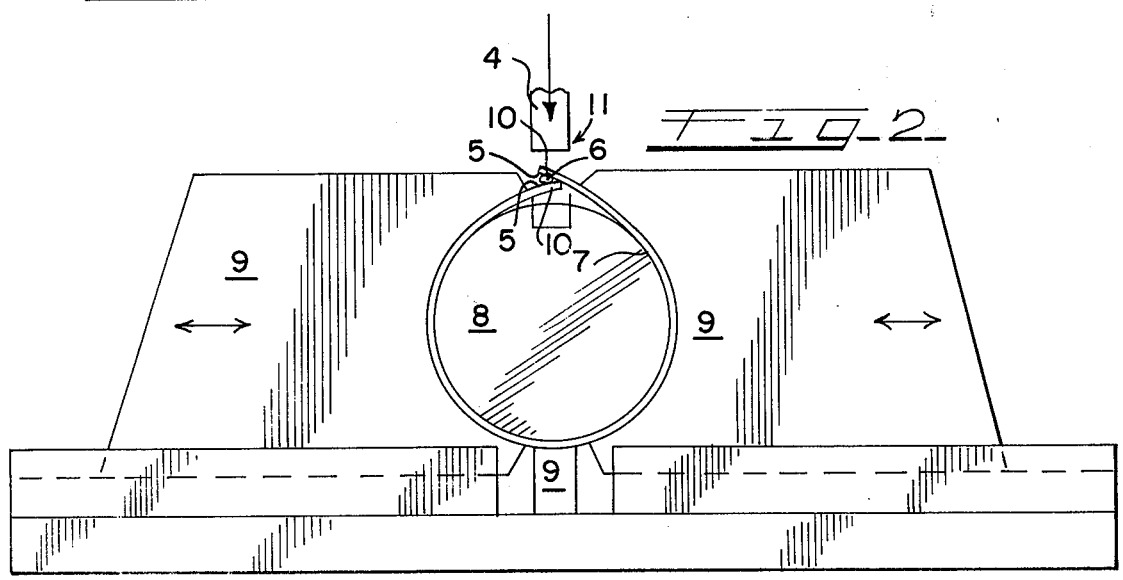
Fig. 2

HIGH SPEED ROOM TEMPERATURE SEAM BONDING OF METAL SHEETS

SUMMARY OF THE INVENTION

The present invention relates to pressure welding and more particularly, to cold pressure welding.

It is already known to join a pair of metal members, such as sheets, plates etc. capable of being cold pressure welded by a lap joint by applying pressure to the superposed members substantially at right angles to the interface or weld area through the use of suitably shaped impression tools or dies. As a result of the applied pressure, metal is caused to flow outwardly from under the pressure applying die surfaces or weld area, thereby causing a merging or intimate union of the adjoining metals equivlalent to a solid phase welding bond at that area.

In a method of the above character, the metal flow varies within substantial limits at different points of the usual strip-like or rectangular weld area, being greater at the edges of the strip or longer sides of the rectangular weld area and being reduced towards the center on account of the greater impedance offered to the flow of the metal from the center towards the edges of the area. As a result, substantial welding pressure becomes necessary to insure a sufficient metal flow over the entire weld area conductive to efficient cold pressure welding, the pressure required being furthermore dependent upon the degree of hardness of ductility of the metals being welded. This, in turn, results in a substantial deformation or distortion of the parts of members being welded at and adjacent to the weld spot or area. Commonly, thickness reductions in the members to be joined, of 60 percent or more of each member are required to insure efficient welding. This thinning seriously weakens the weld area. Furthermore, practical limitations imposed by the necessity of applying sufficient pressure may result in unacceptably low bonding speeds.

Among the objects of the present invention is the provision of an improved method of and means for joining a pair of pressure weldable metal members by a lap joint which substantially overcomes the aforementioned and related difficulties and shortcomings, which will afford a more uniform metal flow and, in turn, a more efficient weld over the entire weld area, and which can be carried out easily and reliably while involving a minimum of rejects or defective welds.

With the aforementioned objects in view, the invention involves generally the provision of means for and an improved method of welding a pair of pressure weldable metal members which comprises essentially positioning a sacrificial metal interlay between the faying surfaces to be bonded and compressing the assembly until the interlay is properly spread over the faying surfaces. The interlay has a cross-section designed to produce a highly differential flow when subjected to external compressive loads. This differential flow causes shear movement between the interlay and the faying surfaces which effects the weld.

The invention is especially suitable for lapjoining by cold pressure welding the end portions of a pair of overlapping plates, strips, sheets or similar metal parts, arranged with their edges in register with one another and with the parts extending in the same direction.

Besides many other applications, the invention has special advantages in attaching a cover to a hollow cylindrical member such as welding a lid to a can by cold pressure welding. Thus, the edge of a can of aluminum or other cold weldable metal is flared outwardly to provide taper or cone. A lid having a surface which fits on the taper is placed on top of the can and the lid is welded to the taper by suitable cold pressure welding tools which make a ring weld. The surfaces to be welded together are previously cleaned to remove the oxide film and other surface contamination and to provide clean metal surfaces at the interface to be welded. If the projecting weld is undesirable, this can be dressed down by forcing the whole can top downwards through a die, the weld area then lying close up against the side of the can.

DESCRIPTION OF THE DRAWINGS

The invention will be better understood from the following detailed description taken in conjunction with the accompanying drawings, forming part of this specification and wherein:

FIG. 1 shows partly in section, a tool setup for welding a lid to a can in accordance with the invention;

FIG. 2 shows, partly in section, a tool setup for welding the side seam of a can; and FIGS. 3a–3f show, in cross-sectional views, several interlay configurations.

Like reference characters identify like parts in the different views of the drawings.

DESCRIPTION OF THE PREFERRED EMBODIMENT

Referring to FIG. 1, there is shown a can 1 and lid 2, both of pressure weldable metal. The can is of circular or any other section and has a bottom 1a attached by a double lap seam 1b or any other method. An outwardly directed frusto-conical taper 1d has been formed in the free extremity of the can wall 1c and a mating complementary taper 2a has been formed in the lid 2.

The can 1 is held in a die 3, wherein the die base 3a is adapted to grip the can bottom seam 1b to prevent radial displacement of the can 1, while the die sidewalls 3b provide support for the can taper 1d. The die 3, which is mounted on the platen of a hydraulic press or the like, may comprise a single piece or may be assembled from component pieces as an aid to tool fabrication.

A co-operating punch 4 is also mounted in the press such that it moves rectilinearly and coaxially with respect to the can 1. The punch is adapted to hold the lid 2 while supporting the lid taper 2a.

In operation, the faying surfaces 5 of the can taper 1d and the lid taper 2a are cleaned, using a rotary steel wire brush or the like, and a metal interlay 6 is placed therebetween to form a weld assembly. The punch 4 is then brought down under pressure, compressing the assembly and causing the interlay 6 to deform and spread over the faying surfaces 5, thereby welding the assembly in a solid phase bond.

Referring to FIG. 2, there is shown a sheet 7 of pressure weldable metal, bent to form a hollow cylinder. The sheet 7 is constrained between concentric circular male 8 and female 9 dies with the axial edges 10 overlapping; the overlap being exposed by an opening 11 in the female die 9. The dies 8 and 9 are mounted on the platen of a hydraulic press or the like.

A co-operating punch 4 is also mounted on the press such that it moves rectilinearily and radially with respect to the cylindrically formed sheet 7.

In operation, the faying surfaces 5 of the sheet axial edges 10 are cleaned, using a rotary steel wire brush or the like, and a metal interlay 6 is placed therebetween to form a weld assembly. The punch 4 is then brought down under pressure, compressing the assembly and, causing the interlay 6 to deform and spread over the faying surfaces 5 thereby welding the assembly in a solid phase bond.

The interlay 6 has a cross-section which results in a highly differential flow when subjected to external compressive loads; the ratio of the rate of deformation measured along one axis to the rate of deformation measured along a perpendicular axis preferably being in the range of 5:1 to 30:1, with the highest ratio being most preferably. Although the mechanism is not fully understood, it appears that the differential rates of flow between the interlay 6 and the two faying surfaces 5 produce an intense interfacial or shear flow. This shear flow serves to scrape off any oxide coating which may have formed on the faying surfaces 5 after the preweld cleaning (the presence of oxygen in the atmosphere causes these oxides to begin forming immediately after the cleaning) and which would tend to reduce the quality of a cold pressure weld. The flow further serves to cause intense localized facial heating. Further heating results from the pressure exerted on the weld assembly. The heat, the pressure and the intimate contact between the faying surfaces 5 and the interlay 6 all combine to produce the desired weld.

The desired differential in the shear flow rates is dependent upon the relative hardness of the interlay 6 and the base metal, the desired degree of thickness reduction of the base metal, and the surface condition of the interlay 6 and the faying surfaces 5.

The desired differential may vary during the course of effecting the weld. For example, it may be desirable to initially have a relatively low shear differential to scrape off any oxide coating on the interlay 6 or the faying surfaces 5, followed by a relatively high differential to effect the weld. Further, it may be desirable to have different shear flow differentials at the two faying surfaces 5 if the underlying base metals are of different hardness.

It is therefore, necessary to choose an interlay 6 configured to provide the desired time/location pattern of shear flow differential.

FIGS. 3a–3f illustrates some of the possible interlay 6 cross-sections, including round, oval, diamond with depressions at opposing corners, arrow-head and rectangular with asymetrically placed void. These sections, when compressed between two faying surfaces 5, will produce the desired highly differential flow, each, however, producing a different pattern of flow differential. Improperly designed cross-sections, such as simple rectangles, undergo thickness reduction without such differential flow. Instead, the interlay material merely extrudes in the unrestrained directions.

The pressure necessary to effect the weld is dependent upon the shear resistance of the interlay 6 and the faying surfaces 5. Preliminary results indicate that a pressure of about 150 percent of the surface stress of the interlay material is sufficient, provided that this pressure produces contact stresses at the points of contact between the interlay 6 and the faying surfaces 5 sufficient to cause some localized flowing of the base metal underlying the surfaces 5.

The interlay 6 is preferably softer than the base metal. When the interlay hardness is equal to or greater than that of the base metal, the interlay 6 does not spread over the faying surfaces 5, but, rather, cuts into the base metal. The proper hardness for the interlay 6 must be determined experimentally and largely depends upon the desired thickness reduction in the base metal, the minimum reduction occurring when the interlay 6 is very soft as compared to the base metal. Experimental results indicate that an optimum weld is achieved when the interlay thickness has been reduced by 65–99 percent. This may be accompanied by a thickness reduction in the base metal of about 5 percent. The interlay 6 may also be formed of a soft filler metal 6a with several fine wires 6b of a stronger, harder metal disposed therein (see FIG. 3f). The presence of these wires 6b increases the differential flow of the interlay 6 during the deformation process and elevates the shear resistance of the accomplished bond. Thus, the strength characteristics of the bond may be talored through proper orientation of the wires 6b.

Preliminary results indicate that this process permits cold pressure bonding at speeds of 10 feet per second.

While the invention has been described herein with specific reference to cold pressure welding, i.e. welding at room temperature or without the use of any appreciable amount of external heat, it will be understood that some heat may be applied to the members being welded provided, however, that welding is essentially effected as a result of the heat and pressure-induced plastic flow of the metal, to effect merging or intimate welding at the interfaces in the manner described. The additional heat may be supplied by either heating the pressure welding tools, or the members to be welded may be heated either before or during welding.

In the foregoing the invention has been described by reference to a few illustrative tools and methods. It is to be understood, however, that variations and modifications of both the described tools and method steps, as well as the substitution of equivalent tools and steps, may be made without departing from the broad scope and spirit of the invention as set forth in the appended claims. The specification and drawings are accordingly to be regarded in an illustrative rather than in a limiting sense.

I claim:

1. In a method of cold pressure welding a pair of cold pressure weldable metal members arranged with edges of superposed end portions of said members substantially in register with one another, comprising the steps of placing a metallic interlay between the faying surfaces to be bonded to form a weld assembly and compressing said weld assembly, thereby creating an intense interfacial flow conducive to bonding of said member in a solid phase welding bond, and wherein said interlay is of cross-section such as to deform at substantially different rates, as measured along mutually perpendicular axes, consequent to said compression of said assembly.

2. In a method according to claim 1, wherein the ratio of the rate of deformation along one axis to the rate of deformation along a perpendicular axis is in the range of about 5:1 to about 30:1.

3. In a method according to claim 1, wherein the maximum hardness of said interlay is equal to the hardness of said members to be joined.

4. In a method according to claim 1, wherein said interlay has a substantially circular cross-section.

5. In a method according to claim 1, wherein said interlay has a substantially oval cross-section.

6. In a method according to claim 1, wherein said interlay has a cross-section which is substantially diamond-shaped with depressions formed in place of two opposing corners.

7. In a method according to claim 1, wherein said interlay has an arrow-head shaped cross-section.

8. In a method according to claim 1, wherein said interlay has a substantially square cross-section with a void disposed therethrough.

9. In a method according to claim 8, wherein said void is asymetrically located.

10. In a method according to claim 1, wherein said interlay comprises a filler metal and metal wires disposed within said filler metal, the hardness of said wires exceeding the hardness of said filler metal.

11. A method of cold pressure welding a cover member to the edge of a hollow tubular member, both said members consisting of cold pressure weldable metal, comprising outwardly bending the end portions of said members to provide frustoconical interfitting flanges, placing said cylindrical member in a die wherein said die supports said flange on said cylindrical member, mounting said cover member on a circular punch wherein said punch supports said flange on said cover member, said punch being concentric with said die, placing a metallic interlay between the faying surfaces of said members, said flanges and said interlay comprising a weld assembly, and axially displacing said punch relative to said die to compress said weld assembly thereby creating an intense interfacial flow conducive to bonding of said members in a solid phase welding bond.

12. In a method according to claim 11, wherein said interlay is of cross-section such as to deform at substantially different rates, as measured along mutually perpendicular axes, consequent to said compression of said assembly.

13. In a method according to claim 12, wherein the maximum hardness of said interlay is equal to the hardness of said members to be joined.

14. A method of cold pressure welding a lapped side-seam to form a hollow tube from a preformed sheet of cold pressure weldable metal, comprising placing said preformed sheet between mating male and female dies such that the axial edges of said sheet overlap, said female die having an opening exposing said overlap, placing a metal interlay between the faying surfaces of said edges, said edges and said interlay comprising a weld assembly, and compressing said weld assembly between said male die and a punch, said punch acting through said opening in said female die, said compression creating an intense interfacial flow conducive to bonding of said edges in a solid phase welding bond.

15. In a method according to claim 14, wherein said interlay is of cross-section such as to deform at substantially different rates, as measured along mutually perpendicular axes, consequent to said compression of said assembly.

16. In a method according to claim 15, wherein the maximum hardness of said interlay is equal to the hardness of said edges to be joined.

* * * * *